US009578018B2

(12) United States Patent
Liu et al.

(10) Patent No.: US 9,578,018 B2
(45) Date of Patent: *Feb. 21, 2017

(54) REMOTE SIGN-OUT OF WEB BASED SERVICE SESSIONS

(71) Applicant: Microsoft Corporation, Redmond, WA (US)

(72) Inventors: Johnny Liu, Fremont, CA (US); Keith Senzel, Seattle, WA (US); Ye Gu, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/513,180

(22) Filed: Oct. 13, 2014

(65) Prior Publication Data

US 2015/0249657 A1 Sep. 3, 2015

Related U.S. Application Data

(63) Continuation of application No. 12/143,848, filed on Jun. 23, 2008, now Pat. No. 8,863,265.

(51) Int. Cl.
*H04L 29/06* (2006.01)
*H04L 29/08* (2006.01)

(52) U.S. Cl.
CPC ......... *H04L 63/083* (2013.01); *H04L 63/0807* (2013.01); *H04L 67/142* (2013.01)

(58) Field of Classification Search
CPC ... H04L 63/083; H04L 67/142; H04L 63/0853

(Continued)

(56) References Cited

U.S. PATENT DOCUMENTS 6,088,450 A 7/2000 Davis et al.
7,299,364 B2 11/2007 Noble et al.
(Continued)

FOREIGN PATENT DOCUMENTS

| EP | 1569477 A1 | 8/2005 |
| WO | 2005024743 A1 | 3/2005 |
| WO | 2007055558 A1 | 5/2007 |
| WO | 2007072001 A1 | 6/2007 |

OTHER PUBLICATIONS

Corner, et al., "Protecting Applications with Transient Authentication", International Conference on Mobile Systems, Applications and Services, Proceedings of the 1st international conference on Mobile systems, applications and services, Date: 2003, pp. 1-12, Publisher: ACM Press New York, USA.

(Continued)

*Primary Examiner* — William Goodchild
(74) *Attorney, Agent, or Firm* — Daniel Choi; Micky Minhas (57) ABSTRACT

Remote sign-out of web based service sessions. As a part of remote sign-out of web based service sessions, a user authentication token is accessed that is used to establish a web based service session and this user authentication token is stored in memory of an authentication server and returned in a cookie to the device. User access and deletion of the user authentication token from memory is accommodated using a device different from that which initially established the web based service session. Upon receipt of a browser request involving the user authentication token, it is determined whether the user authentication token is stored in memory. An access denial indication is provided to a web based service that indicates that the user authentication token is not stored in memory.

19 Claims, 6 Drawing Sheets

(58) Field of Classification Search
USPC .......................................................... 726/9
See application file for complete search history.

(56) References Cited

U.S. PATENT DOCUMENTS

| 7,532,618 | B1* | 5/2009 | Saurabh | H04L 12/66 370/352 |
|---|---|---|---|---|
| 2004/0073903 | A1* | 4/2004 | Melchione | G06F 8/60 717/172 |
| 2005/0015601 | A1 | 1/2005 | Tabi | |
| 2007/0169175 | A1* | 7/2007 | Hall | H04L 63/0807 726/3 |
| 2007/0199053 | A1* | 8/2007 | Sandhu | G06F 21/31 726/4 |
| 2008/0046988 | A1 | 2/2008 | Baharis et al. | |

OTHER PUBLICATIONS

Ford, et al., "Persistent Personal Names for Globally Connected Mobile Devices", Operating Systems Design and Implementation, Proceedings of the 7th symposium on Operating systems design and implementation, Date: 2006, pp. 233-248, Publisher: USENIX Association Berkeley, CA, USA http://www.usenix.org/evenUosdi06/tech/full_papers/ford/ford_html/.

Nicholson, et al., "Mobile Device Security Using Transient Authentication", IEEE Transactions on Mobile Computing, vol. 5, No. 11, Nov. 2006, pp. 1489-1502.

Noble, et al., "The Case for Transient Authentication", ACM SIGOPS European Workshop, Proceedings of the 10th workshop on ACM SIGOPS European workshop, Date: 2002, pp. 24-29, Publisher: ACM Press New York, USA.

* cited by examiner

REMOTE SIGN-OUT OF WEB BASED SERVICE SESSIONS

RELATED APPLICATIONS

This application is a continuation of and claims priority to application Ser. No. 12/143,848, filed on Jun. 23, 2008, and entitled "REMOTE SIGN-OUT OF WEB BASED SERVICE SESSIONS." This application claims the benefit of the above-identified application, and the disclosure of the above-identified application is hereby incorporated by reference in its entirety as if set forth herein in full.

BACKGROUND

Conventional web based service sign-in processes present a barrier to accessing web based services from a mobile device. Web based services that store user data (e.g., web based email, calendaring, address book etc.) require users to sign in at the start of each session in order to verify their identities before granting the users access to their personal data. This contributes to a poor user experience as users are required to perform operations such as the entering of usernames and passwords that are formatted for a PC (many of which are long and include characters difficult to type in on a mobile device).

A conventional solution to improving the sign-in experience is to keep user sessions valid for an extended period of time after a user has signed in once by saving their authentication token in persistent cookies that have an extended expiration period (e.g., one year). A problem with this approach is that once a user is signed in on a mobile device and that device is lost, there is no way to revoke the live user session on that device. In some cases, the live user session may not even be revoked by the changing of the user's password. This is because the authentication token in the persistent cookie remains valid and thus the web based service, when encountering this persistent cookie, will not require additional validation. Consequently, anyone obtaining possession of the device can subsequently use it and masquerade as the original user for the duration of the period that the persistent cookie remains valid.

Microsoft Exchange Server™ (2003 or later) implements a remote device wipe mechanism as part of its over-the-air data synchronization protocol. This remote device wipe deletes all user-related data, including any persistent cookie, on a mobile device and essentially resets the device into its original factory configuration. Windows Mobile™ and other licensees of this protocol support this function through on-device applications. As a part of this approach data wipes are triggered by the Exchange Server and the command is either pushed to a device through a persistent HTTP connection required by the protocol (if the devices always-up-to-date feature is turned on) or pulled by a device at the next scheduled over-the-air data synchronization.

Other conventional products such as RIM Blackberry provide similar features. All of the aforementioned conventional products require mobile devices to have native applications pre-installed thereon in order to support the execution of the remote device data wipe. Moreover, because the data wipes may be correlated to scheduled synchronizations, an intervening misappropriation of a device with an ongoing live user session can enable malfeasant access to user personal data that is provided by a web based service. Because of shortcomings such as these, conventional systems such as those discussed above are inadequate as it relates to security issues that are commonplace in the current technological environment.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Conventional sign-in processes for web based services result in the maintenance of persistent cookies on the sign in device. Conventional approaches to automatically ending web based service sessions that involve such persistent cookies require additional software to be installed on individual devices. Moreover, the software is typically only periodically invoked such that unauthorized access to user personal data due to misappropriation of the sign-in device at intervening points is not effectively addressed. A methodology for remote sign-out of web based service sessions that addresses such issues by enabling the remote sign out of the web based service session at any time is disclosed. As a part of the disclosed methodology, a user authentication token is accessed that is used to establish a web based service session and this user authentication token is stored in memory of an authentication server and returned in a cookie to the device. User access and deletion of the user authentication token from memory is accommodated using a device different from that which initially established the web based service session. Upon receipt of a browser request involving the user authentication token, it is determined whether the user authentication token is stored in memory. An access denial indication is provided to the involved web based service indicating that the user authentication token is not stored in memory. For example, someone can steal a cell phone from a user that has a live web based service session on-going. In one embodiment, to prevent the thief from obtaining personal information of the user that is contained at the web based service, the user can delete authentication token from memory associated with the web based service from a remote computer. In this manner, any subsequent attempts by the thief to use the web based service with the user's stolen cell phone will not be allowed.

BRIEF DESCRIPTION OF THE DRAWINGS

The accompanying drawings, which are incorporated in and form a part of this specification, illustrate embodiments and, together with the description, serve to explain the principles of the embodiments.

The drawings referred to in this description should not be understood as being drawn to scale except if specifically noted.

DETAILED DESCRIPTION

Reference will now be made in detail to various embodiments, examples of which are illustrated in the accompanying drawings. While descriptions will be provided in conjunction with these embodiments, it will be understood that the descriptions are not intended to limit the scope of the embodiments. On the contrary, the disclosure is intended to cover alternatives, modifications and equivalents, of these embodiments. Furthermore, in the following description, numerous specific details are set forth in order to provide a thorough understanding of embodiments. In other instances, well-known methods, procedures, components, and circuits have not been described in detail as not to unnecessarily obscure aspects of embodiments.

As used herein the term "token" is intended to refer to authenticating code. In one embodiment, the authenticating code can include static information as well as information related to user validity. In other embodiments, the authenticating code can included other components. In one embodiment, as used herein the term "token" can refer either to a single unit of authenticating code or a plurality of units of authenticating code. Likewise, in one embodiment, as used herein the term "token" can refer either to a single token or a plurality of tokens. In embodiments where the term "token" refers to a plurality of tokens, at least one token of the plurality of tokens can be deleted by a user to prompt the denial of unauthorized access.

Figure 1A:
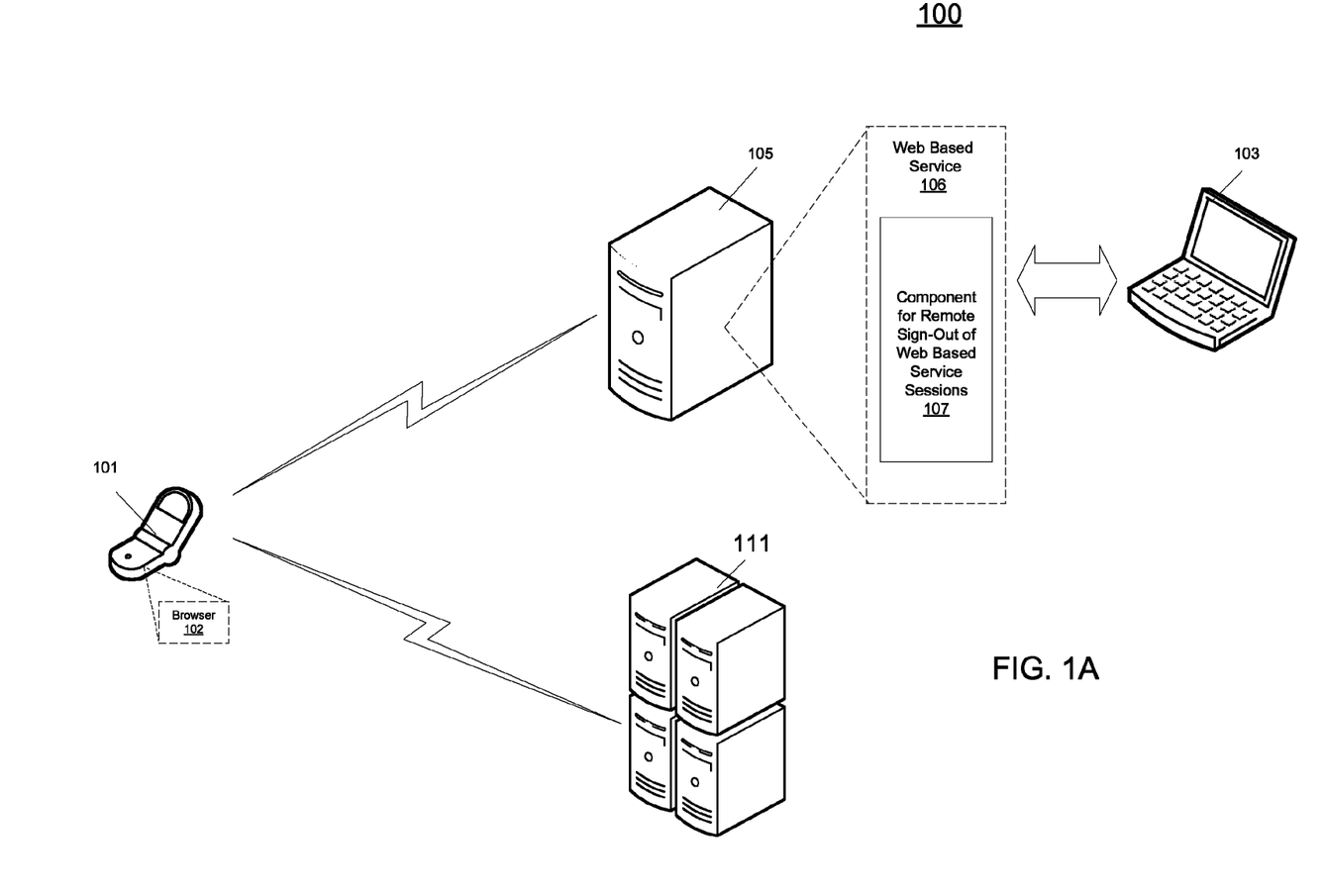
FIG. 1A shows an exemplary operational setting of a component for remote sign out of web based service sessions according to one embodiment.

Exemplary Operational Setting of a Component for Remote Sign-Out of Web Based Service Sessions According to Embodiments FIG. 1A shows an exemplary operational setting 100 of a component 107 for remote sign out of web based service sessions according to one embodiment. Conventional approaches to automatically ending web based service sessions that involve persistent cookies on a sign in device require additional software to be installed on individual devices and operates periodically such that unauthorized access due to misappropriation of the sign in device at intervening points is not effectively addressed. In one embodiment, component 107 addresses this issue by enabling the sign out of a web based service session at any time from a remote device. FIG. 1A shows initial sign in device 101, browser 102, remote sign out device 103, server 105, web based service 106, component 107 and authentication service 111.

Referring to FIG. 1A, initial sign in device 101 is a device that is used by a user to sign in to a web based service. In one embodiment, initial sign in device 101 has one or more browsers 102 installed thereon that facilitate web access. In one embodiment, the user's browser can support cookies. In one embodiment, the cookies can contain tokens that provide authentication data that enable web based service 106 to be easily accessed.

Web based service 106 is an application rendered web service that is hosted by server 105 such as can be accessed by a user of initial sign in device 101. In one embodiment, web based service 106 provides protected or personalized content to customers who are authenticated. In one embodiment, web based service 106 can store authentication information related to customers. In one embodiment, web based service 106 can maintain an internal table that can store authentication tokens that contain customers unique identifiers.

Component 107 is an executable program that facilitates remote sign-out of live web based service 106 sessions. In one embodiment, component 107 enables remote deletions (deletions from a device other than the sign in device) of authentication tokens from web based service 106. This enables customers to terminate live web based service 106 sessions that are initiated from a first device from any available device (that can access web based service 106), such as remote sign out device 103. As a part of its operation, component 107 accesses a customer request to delete a user authentication token from a data storage table associated with web based service 106 and responsive to this request deletes the user authentication token from the data storage table that is associated with web based service 106. Upon receipt of a subsequent request from browser 102 involving the authentication token, component 107 can provide an access denial indicator to web based service 106 indicating that the authentication token has been invalidated such that access is denied. It should be appreciated that in one embodiment component 107 provides a browser-based solution to the termination of a persistent session on a mobile device as opposed to solutions that require the installation of software on the mobile device.

In one embodiment, component 107 can form an integral part of web based service 106. In other embodiments, component 107 can be separate from web based service 106 but operate cooperatively therewith. Component 107 can be implemented in software, hardware or a combination of both.

In one embodiment, component 107 facilitates two orthogonal but complimentary checks to confirm the validity of authentication information that is provided to web based service 106 in a browser cookie: (1) verifying a flag associated with the authentication token, and (2) verifying any password change. In one embodiment, component 107 can direct the performance of these checks on each browser request to web based service 106 or, for better performance, at the creation of a new web based service 106 session for a browser request. In one embodiment, (1) can be accomplished by setting a flag for each new authentication token to indicate that it is valid. The flag can be later cleared from remote sign out device 103 (e.g., personal computer (PC) or another mobile device different from initial sign in device 101). This action will effectively invalidate the authentication token and force anyone attempting to gain access to web based service 106 using the invalidated token to re-authenticate by signing in again. Additionally, as it regards (2) in one embodiment, component 107 can direct that when a password is separately changed anyone attempting to access web based service 106 using browser 102 be required to sign-in again.

Web based authentication service 111 is an external user identification (ID) systems that is employed by web based service 106 to establish and authenticate user identities and grant appropriate access permission. Authentication services reduce user sign-in operations and enable multiple independently developed and operated services to share a common set of user credentials. Additionally, authentication services enable service-to-service integration. For example, a user can initially sign into one web based service that utilizes an authentication service and then be silently signed into others. The role that authentication service 111 plays in exemplary embodiments is described in detail below with reference to FIG. 1B.

Operation

Figure 1B:
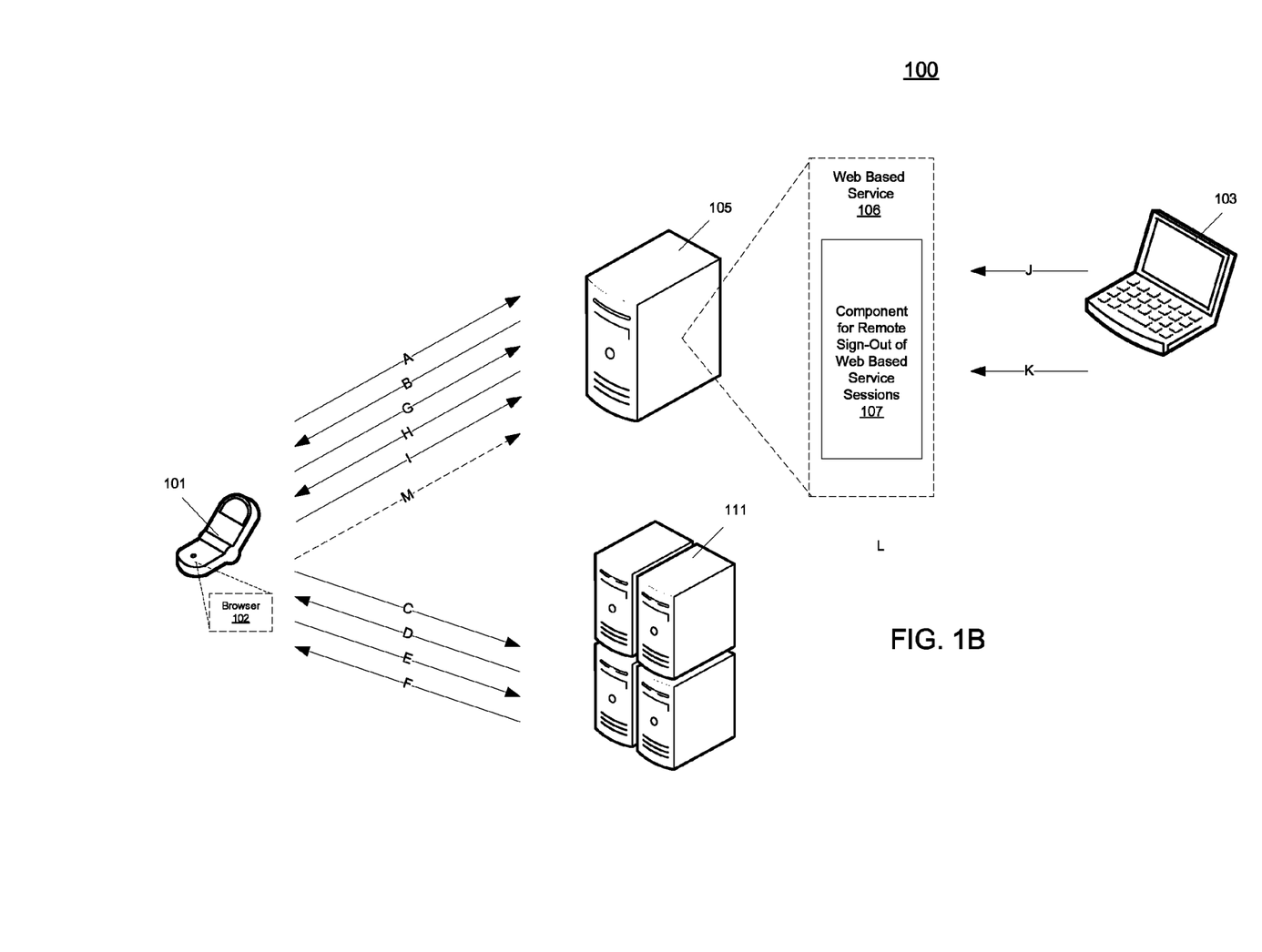
FIG. 1B illustrates operations performed in a remote sign in process according to one embodiment.

FIG. 1B illustrates operations A-K performed in a remote sign in process according to one embodiment. These operations including the order in which they are presented are only exemplary. In other embodiments, other operations in other orders can be included.

At A, a customer requests a web page from initial sign in device 101 using browser 102. In FIG. 1B, the customer is shown as having visited web based service 106 before having signed in via authentication service 111.

At B, web based service 106 returns a sign-in link to the customer. It should be appreciated that this can be done via a web page that displays a special sign-in link in an IFRAME element.

At C, the customer clicks the sign-in link.

At D, in response to the customer clicking the sign-in link, the authentication service returns a sign-in page. In this manner the customer is directed to the sign in page of the authentication service.

At E, the customer supplies their credentials. The customer does this by using the sign-in page of the authentication service to type their authentication service credentials (e.g., e-mail name and password, etc.) into a text box and then submits the credentials such as by clicking a graphical button.

At F, the authentication service 111 authenticates the customer. In one embodiment, the authentication service 111 authenticates the customer by receiving the sign-in request and validating the customer's credentials.

At G, the authentication service 111 redirects the customer to the site of web based service 106. If the customer's credentials are valid, authentication service 111 responds by redirecting the customer to the web site of web based service 106 along with an authentication token as a FORM POST parameter. In one embodiment, this token is proof that authentication service 111 has verified the customer's identity. In one embodiment, the web based service 106 can decrypt this token to obtain the customer's unique identifier.

At H, web based service 106 displays protected or personalized content. After a customer's unique identifier has been obtained, it can be stored and/or protected or personalized content displayed.

At I, the customer logs off of web based service 106.

At J, for example because initial sign in device 101 has been lost or stolen, the customer signs in to web based service 106 from a different computer system than that which was used to initially sign in.

At K, the customer makes a request that all previously issued authentication tokens be deleted.

Figure 1C:
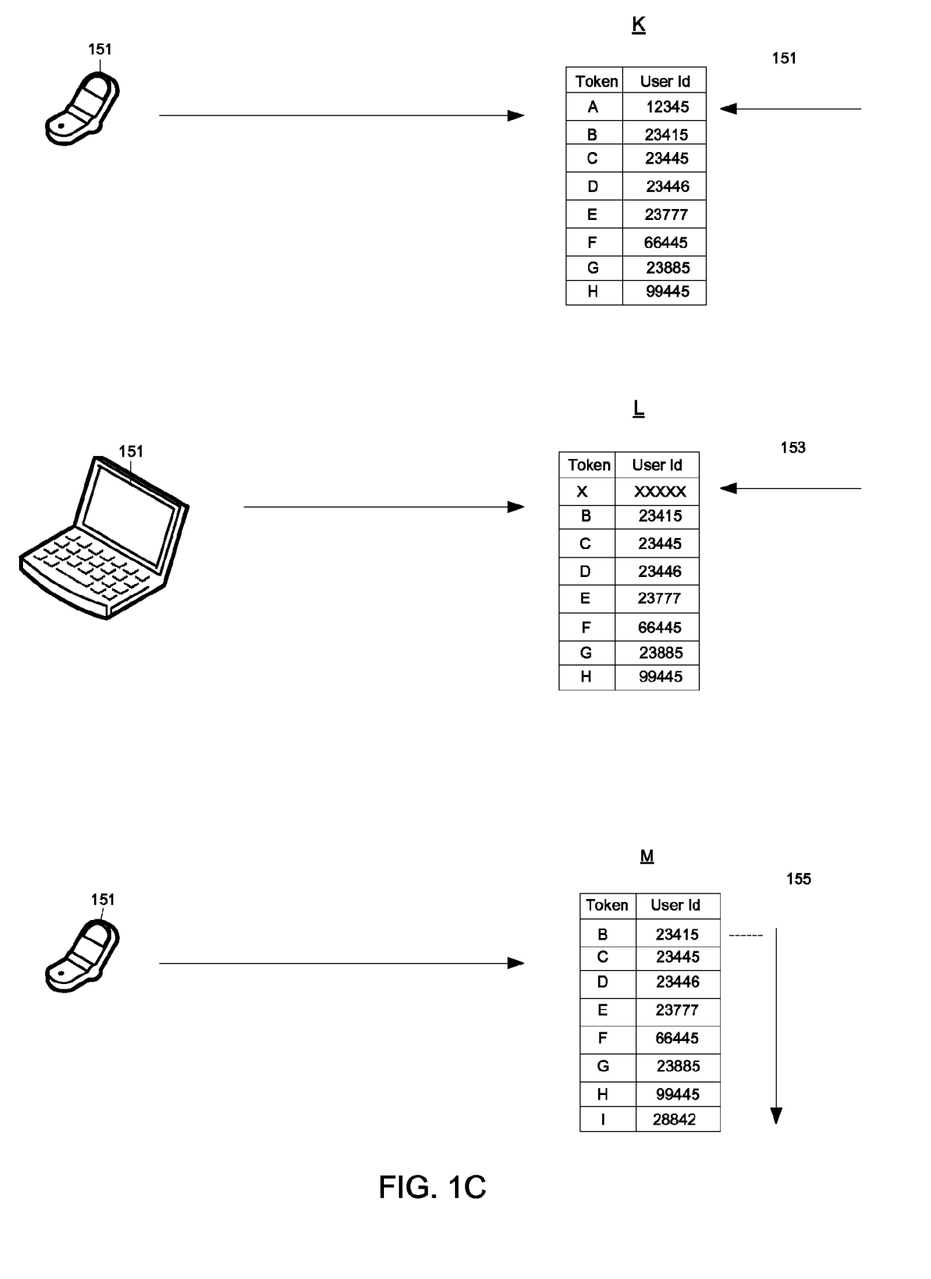
FIG. 1C illustrates a scan of the data storage table that reveals that an authentication token and user identifier corresponding to a cookie associated with an initial sign in browser are not present in the data storage table according to one embodiment.

At L, component 107 accesses the request and in response directs the deletion of all previously issued authentication tokens from a data storage table associated with web based service 106. Operations I and J are illustrated in FIG. 1C at 151 and 153 where the authentication tokens issued are shown as accessed by customer and deleted respectively.

Referring again to FIG. 1B, at M, subsequently, when an attempt is made to access web based service 106 using the initial sign in browser 102, the individual attempting to gain access to web based service 106 is required to re-authenticate. This is illustrated in FIG. 1C at 155 where a scan of the data storage table reveals that the token corresponding to the cookie associated with the initial sign in browser 102 is not present in the data storage table.

Additional Exemplary Implementation Details

In one embodiment, the above described authentication flow may be the same whether a personal computer (PC) browser or a mobile browser is used. If the customer's browser supports cookies (as is the case for PC browsers and most mobile browsers), the web based service server 105 will store the authentication token in the browser cookie following operation E. Furthermore, if the user has chosen to save his/her password in operation F, the authentication token may be stored in a persistent cookie. Typically, such cookies are set to have a very long expiration period.

It should be appreciated that passwords are typically not saved by default on PCs. However, for mobile devices, saving passwords to persistent cookies may be done by default. This greatly improves the user experience because keying in passwords (formatted for the PC) can be particularly cumbersome. However, this feature presents a problem if a user loses his/her mobile device because the authentication token that is stored in the persistent cookie will remain valid until it expires. Importantly, anyone taking possession of the mobile device can access the original owner's personal data, and worse, impersonate that user for an extended period of time.

When someone other than the rightful owner takes possession of the mobile device, the rightful owner has no way to block the other person from accessing his/her data remotely. Moreover, changing a password may not solve the problem either because the authentication service may not invalidate any outstanding authentication token for that reason. In exemplary embodiments, this problem is addressed by keeping track of valid authentication tokens as discussed above with reference to FIGS. 1A-1C.

In one embodiment, as discussed above, this can be accomplished by either explicitly setting a flag on every new authentication token that is encountered or implicitly using the presence of a token. For instance, after operation G above, web based service 106 can store in its internal data storage table a customer's authentication token (or a hash version of the authentication token for enhanced security) with his/her unique identifier to indicate that it is valid (see FIG. 1C). Moreover, in one embodiment, when web based service 106 receives a browser request on behalf of the customer, it extracts the authentication token from a cookie and checks to see if there is a corresponding token in its internal data storage table (see 155 in FIG. 1C). It will grant access only if a match exists, or otherwise force the user to sign in. Alternatively, web based service 106 can perform this check when it needs to create a new server session to process an incoming request instead of on each request. This improves server performance since each web service session generally handles multiple requests before timed out.

In one embodiment, if a customer happens to misplace or lose his/her mobile device, he/she can sign into web based service 106 from a PC or a different mobile device 103. In exemplary embodiments, this feature enables a customer to delete all previously issued authentication tokens, which removes any existing token that is associated with that customer unique identifier from its internal data storage table. Subsequent to this, web based service 106 will request that anyone attempting to access the web based service using the browser associated with initial sign in device 101 (e.g., browser 102) to re-authenticate because it will no longer be able to find a matching token in its internal data storage table for the token provided from the browser cookie.

In one embodiment, in operations parallel to those discussed above with reference to FIGS. 1A-1C, component 107 can check to see if the user has changed his/her password periodically. In one embodiment, it can do this when a new web based service session, every 24 hours, etc. In one embodiment it can delete authentication tokens for that user from its internal data storage table if it detects a password change event. It should be appreciated that this action would also force anyone trying to use initial sign in device 101 to gain access to sign in again on the next request.

Figure 2:
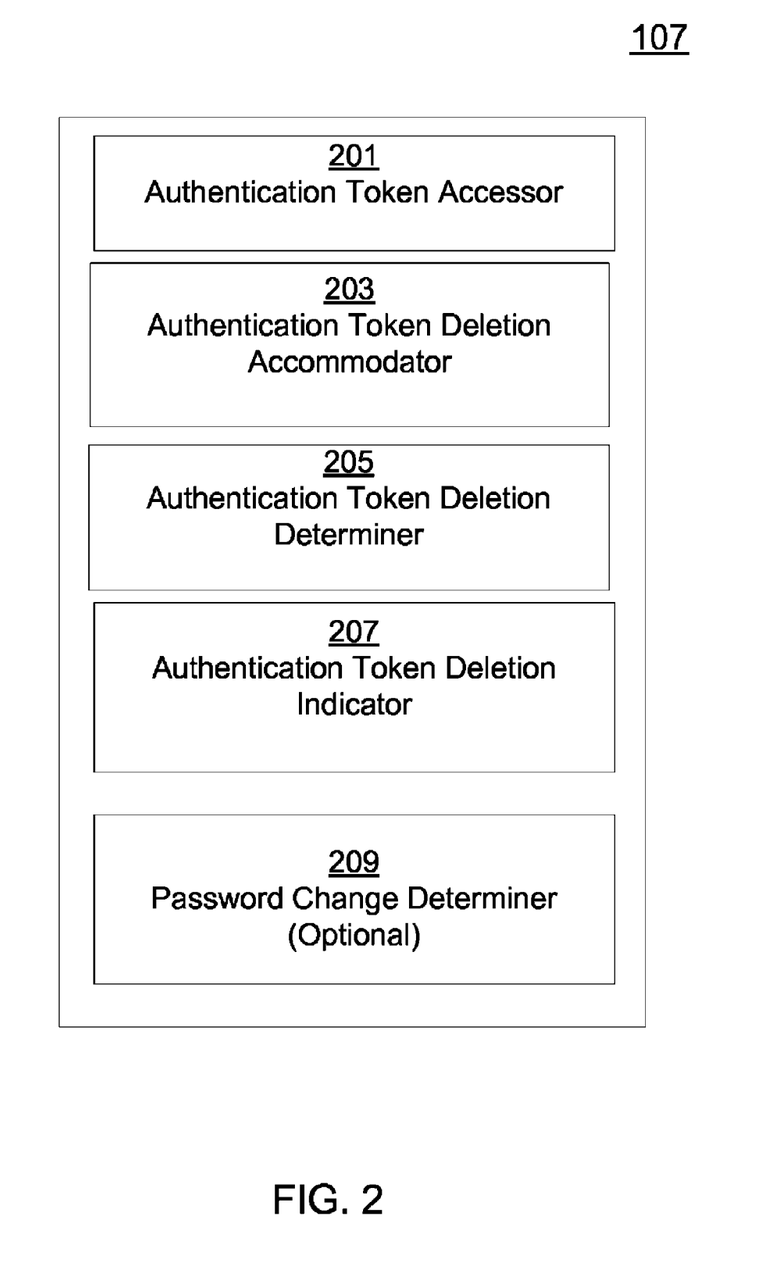
FIG. 2 shows subcomponents of component for remote sign-out of web based service sessions according to one embodiment.

Subcomponents of Component for Remote
Sign-Out of Web Based Service Sessions
According to Embodiments FIG. 2 shows components of component 107 for remote sign-out of web based service sessions according to one embodiment. In one embodiment, component 107 implements and algorithm for the remote sign-out of web based service sessions. In the FIG. 2 embodiment, component 107 includes authentication token accessor 201, authentication token deletion accommodator 203, authentication token deletion determiner 205, authentication token deletion indicator 207 and password change determiner 209.

It should be appreciated that aforementioned components of component 107 can be implemented in hardware or software or in a combination of both. In one embodiment, components and operations of component 107 can be encompassed by components and operations of one or more computer programs (e.g. web based service 106). In another embodiment, components and operations of component 107 can be separate from the aforementioned one or more computer programs but can operate cooperatively with components and operations thereof.

Referring to FIG. 2, authentication token accessor 201 accesses a customer authentication token that is used to establish a first web based service session and stores the authentication token in a data storage table. In one embodiment, the authentication token is provided by the browser that is located on the computer system (e.g., initial sign in device 101 in FIG. 1A) that is used to sign in and contain a customer identifier.

Authentication token deletion accommodator 203 accommodates user access and deletion of authentication tokens from the data storage table that is associated with the web based service using a browser that is different from that which initially established the session. In one embodiment, authentication token deletion accommodator 203 accommodates requests (e.g., by providing interface support that accommodates the receipt of such requests, carrying out deletions, etc.) from customers to delete authentication tokens from the data storage table and responsive to the request, carries out a deletion of the authentication tokens from the data storage table.

Authentication token deletion determiner 205 determines if a particular authentication token is stored in the table upon receipt of a browser request that involves that authentication token. Authentication token deletion determiner 205 checks the data storage table associated with the web based service (e.g., 106 in FIG. 1A) for the presence of an authentication token that is being presented for access to the web based service. If the token that is being presented for access to the web based service is not present in the data storage table associated with the web based service, this information is provided to authentication token deletion indicator 207.

Authentication token deletion indicator 207 provides an access denial indication to the web based service (e.g., 106 in FIG. 1A) indicating that an authentication token being presented to gain access to the web based service has been invalidated. In one embodiment, an indication that the authentication token has been deleted from the internal data storage table prompts the web based service to deny access to anyone attempting to gain access to the web based service using the browser that the token is provided from (such as a browser on a computer system that was used to gain access to the web based service initially but has since been misappropriated).

Password change determiner 209 (optional) determines if a change in password has occurred. In one embodiment, if a change in password occurs, this information can be provided to the web based service as an indicator that any subsequent persons attempting to access the web based service should be required to sign in.

Figure 3:
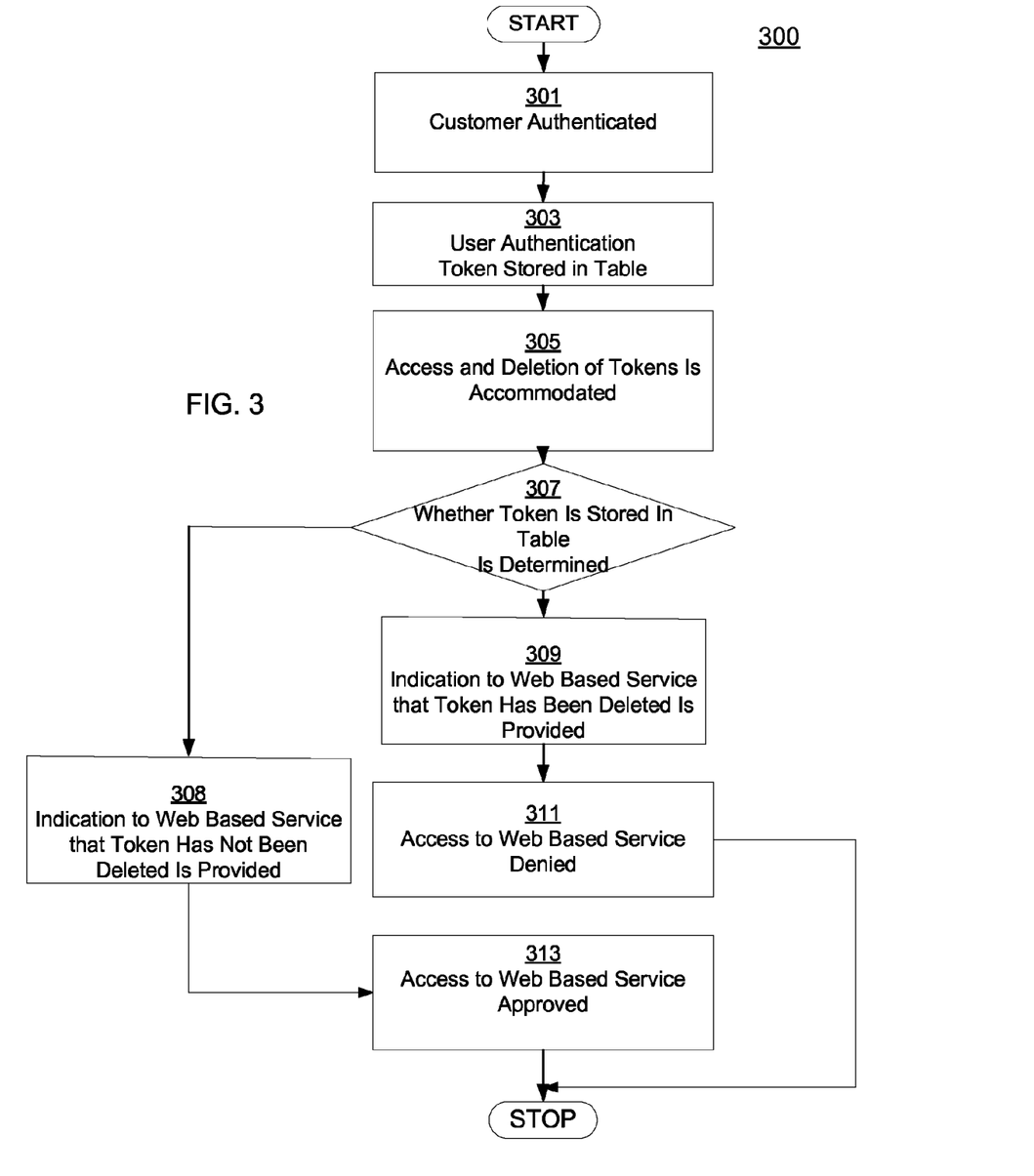
FIG. 3 shows a flowchart of the steps performed in a method for remote sign out of web based service sessions according to one embodiment.

Exemplary Operations of Method for Remote
Sign-Out of Web Based Service Sessions
According to Embodiments FIG. 3 shows a flowchart 300 of the steps performed in a method for remote sign out of web based service sessions according to one embodiment. The flowchart includes processes that, in one embodiment can be carried out by processors and electrical components under the control of computer-readable and computer-executable instructions. Although specific steps are disclosed in the flowcharts, such steps are exemplary. That is the present invention is well suited to performing various other steps or variations of the steps recited in the flowcharts. Within various embodiments, it should be appreciated that the steps of the flowcharts can be performed by software, by hardware or by a combination of both.

Referring to FIG. 2, at step 301 a customer is authenticated to gain access to a web based service and a web based service session is initiated.

At step 303 an authentication token that is used to establish a first web based service session is accessed and the token is stored in a data storage table associated with the web based service. In one embodiment, the authentication token is provided by the browser that is located on the computer system that a customer uses to initially sign in with and contain a customer identifier.

At step 305, customer access and deletion of authentication tokens from the data storage table is accommodated. In one embodiment, request from customers to delete tokens from the data storage table are accommodated, e.g., by providing interface support that accommodates such requests, etc. and responsive to the request, executing a deletion of the specified authentication tokens from the data storage table.

At step 307, whether or not a particular user authentication token is stored in the data storage table is determined upon receipt of a browser request that involves that authentication token. In one embodiment, the data storage table is examined for the presence of an authentication token that is being presented for access to the web based server. If at step 307, it is determined that the particular user authentication token is not stored in the data storage table, then step 308 is executed, where an indication is provided to the web based service that the authentication token is not deleted, and at step 313 access to the web based service is approved.

If at step 307, it is determined that the particular user authentication token is stored in the data storage table then step 309 is executed. At step 309, an access denial indication is provided to the web based service indicating that an authentication token being presented to gain access to the web based service has been invalidated. In one embodiment, an indication that the customer authentication token has been invalidated prompts the web based service to deny access to a user attempting to gain access to the web based service using the browser that the token is provided from (such as a browser on a computer system that was used to gain access initially but has since been misappropriated).

At step 311, in response to step 309, access to the web based service is denied.

Figure 4:
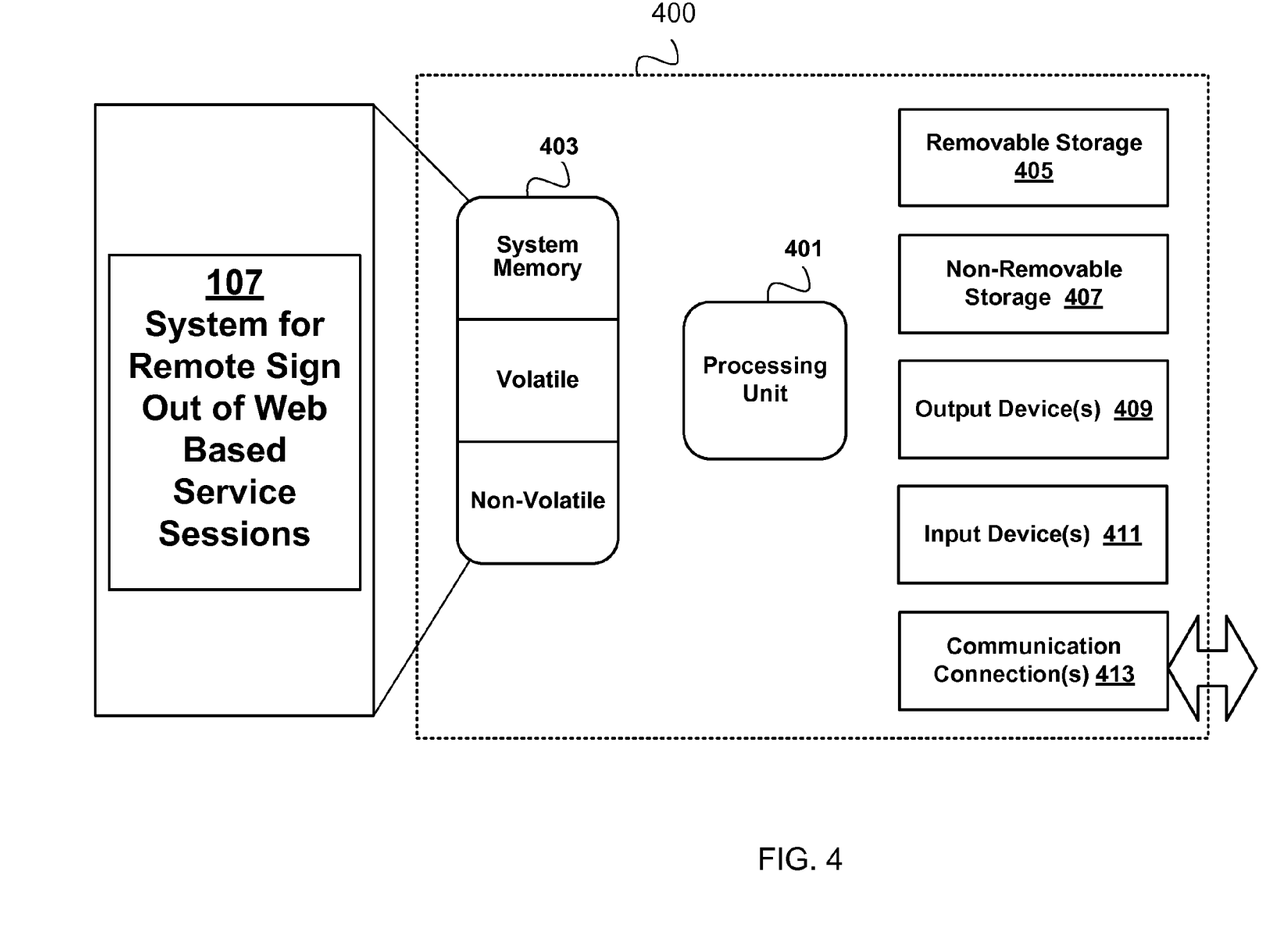
FIG. 4 shows an exemplary computing device according to one embodiment.

Exemplary Hardware Operating Environment of Component for Remote Sign-Out of Web Based Service Sessions According to One Embodiment FIG. 4 shows an exemplary computing device 400 according to one embodiment. Referring to FIG. 4, computing device 400 can be included as a part of a server (e.g., server 105 in FIG. 1A) and/or an interface device (initial sign in device 101 FIG. 1A) in accordance with one embodiment. Computing device 400 typically includes at least some form of computer readable media. Computer readable media can be any available media that can be accessed by computing device 400 and can include but is not limited to computer storage media.

In its most basic configuration, computing device 400 typically includes processing unit 401 and system memory 403. Depending on the exact configuration and type of computing device 400 that is used, system memory 403 can include volatile (such as RAM) and non-volatile (such as ROM, flash memory, etc.) elements or some combination of the two. In one embodiment, as shown in FIG. 1A, a system for remote sign out (see description of component 107 for remote sign out of web based service sessions made with reference to FIG. 1A) can reside in system memory 403.

With reference to exemplary embodiments thereof, remote sign-out of web based service sessions is disclosed. As a part of remote sign-out of web based service sessions, a customer authentication token is accessed that is used to establish a web based service session and the authentication token is stored in a data storage table (e.g., memory) associated with the web based server (hosted by a server). User access and deletion of the authentication token from memory is accommodated using a device different from that which initially established the web based service session. Upon receipt of a browser request involving the authentication token, it is determined whether the authentication token is stored in memory. An access denial indication is provided to the web based service indicating that the user authentication token is not stored in memory.

The foregoing descriptions of specific embodiments have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

The invention claimed is:

1. A method for remote sign-out of web based service sessions, comprising:
    accessing a user authentication token that is used to establish a first web based service session and storing said user authentication token in memory associated with a web based service, the user authentication token authorizing only a single user to access the first web based service session;
    accommodating user access and deletion by the single user of said user authentication token from said memory using a device different from that which initially established the first web based service session, said deletion of said user authentication token being responsive to a user request by the single user to said web based service without installation of software on said device different from that which initially established the first web based service session;
    upon receipt of a browser request involving said user authentication token, determining if said user authentication token is stored in said memory;
    if it is determined that said user authentication token is not stored in said memory, providing an access denial indication to said web based service; and
    determining if a user password has been changed, and if said user password has been changed deleting all user authentication tokens associated with the user from said memory.

2. The method of claim 1 wherein said accommodating comprises:
    upon user request, providing access to a data storage table of said memory that contains said user authentication token;
    upon user request, deleting one or more specified tokens from said data storage table; and
    upon receipt of a subsequent browser request involving said user authentication token, providing an access denial indication to a web based service that indicates that said user authentication token is not stored in said memory so that said browser request will be denied.

3. The method of claim 1 further comprising:
    determining if a user password has been changed periodically, and if said user password has been changed deleting all user authentication tokens from said memory.

4. The method of claim 1 wherein said user authentication token is associated with a first computer system and contains a user identifier.

5. The method of claim 1 wherein said first computer system is a mobile computer system.

6. The method of claim 1 wherein said memory is a data storage table that associates user authentication tokens with an identifier of a user.

7. The method of claim 1 wherein said web based service session is provided by a web based service and is established using an authentication service hosted by a server that is different from a server that hosts said web based service.

8. The method of claim 1 wherein said indication that said user authentication token is not stored in said memory is provided to a web based service.

9. A method for remote sign-out of a web based service session of a mobile device, comprising:
    in response to establishing a first web based service session involving said mobile device, accessing a user authentication token and storing said user authentication token in memory associated with said web based service;

enabling user access and deletion of said user authentication token from said memory using a device different from said mobile device, said deletion of said user authentication token being responsive to a user request to said web based service through a browser without installation of software on said mobile device;

in response to a receipt of a browser request involving said user authentication token from said mobile device, determining if said user authentication token is stored in said memory;

providing an access denial indication to said web based service if it is determined that said user authentication token from said mobile device is not stored in said memory; and determining if a user password has been changed, and if said user password has been changed deleting all user authentication tokens from said memory.

10. The method of claim 9 wherein said accommodating comprises:

upon user request, providing access to a data storage table of said memory that contains said user authentication token; and upon user request, deleting one or more specified tokens from said data storage table.

11. The method of claim 9 further comprising:

determining if a user password has been changed periodically, and if said user password has been changed deleting all user authentication tokens from said memory.

12. The method of claim 9 wherein said user authentication token is associated with a first computer system and contains a user identifier.

13. The method of claim 9 wherein said web based service session is provided by a web based service and is established using an authentication service hosted by a server that is different from a server that hosts said web based service.

14. The method of claim 9 wherein said indication that said user authentication token is not stored in said memory is provided to a web based service.

15. A computer storage medium, the computer storage medium being hardware storing computer-executable components, comprising:

a user token accessing component for accessing a user authentication token that is used to establish a first web based service session and storing said user authentication token in memory of an authentication server, said user authentication token authorizing only a single user to access said first web based service session;

a token deletion accommodating component for accommodating user access and deletion by the single user of said user authentication token from said memory using a device different from that which initially established the session, said deletion of said user authentication token is responsive to a user request to a web based service without installation of software on the device different from that which initially established the session;

token storage determining component for determining if said user authentication token is stored in said memory upon receipt of a browser request involving said user authentication token;

an indicating component for providing an access denial indication to said web based service; and a determining component for determining if a user password has been changed, and if said user password has been changed deleting all user authentication tokens from said memory.

16. The medium of claim 15 wherein said token deletion accommodating component:

upon user request, provides access to a data storage table of said memory that contains said user authentication token;

upon user request, deletes one or more specified tokens from said data storage table; and upon receipt of a subsequent browser request involving said user authentication token, provides an access denial indication to a web based service that said user authentication token is not stored in said memory so that said browser request will be denied.

17. The medium of claim 15 further comprising:

the determining component for determining if a user password has been changed periodically, and if said user password has been changed deleting all user authentication tokens from said memory.

18. The medium of claim 15 wherein said user authentication token is associated with a first computer system and contains a user identifier.

19. The medium of claim 15 wherein said first computer system is a mobile computer system.

* * * * *